United States Patent [19]
Sharp et al.

[11] Patent Number: 5,718,586
[45] Date of Patent: Feb. 17, 1998

[54] POLYMERIC COMPOSITION

[75] Inventors: Michael C. Sharp, Centerport; Michael Barrett, Babylon; Nelson J. Gendusa, Manhasset, all of N.Y.

[73] Assignee: Parkell Products, Inc., Farmingdale, N.Y.

[21] Appl. No.: 791,655

[22] Filed: Jan. 30, 1997

[51] Int. Cl.$^6$ .................................................. A61C 9/00
[52] U.S. Cl. ...................... 433/214; 428/447; 525/477; 433/213; 528/31
[58] Field of Search .................... 433/214, 213, 433/37; 428/447; 525/477; 528/15, 31, 32

[56] References Cited

U.S. PATENT DOCUMENTS

| | | | |
|---|---|---|---|
| 4,007,153 | 2/1977 | Smith . | |
| 4,060,421 | 11/1977 | Yoshikawa et al. . | |
| 4,273,902 | 6/1981 | Tomioka et al. . | |
| 4,468,202 | 8/1984 | Cohen . | |
| 4,543,372 | 9/1985 | Watanabe et al. . | |
| 4,623,700 | 11/1986 | Traver et al. | 525/478 |
| 4,689,248 | 8/1987 | Traver et al. | 427/168 |
| 4,826,893 | 5/1989 | Yamazaki et al. . | |
| 4,877,854 | 10/1989 | Hattori et al. . | |
| 4,891,400 | 1/1990 | Schwabe et al. . | |
| 4,970,245 | 11/1990 | Futami et al. . | |
| 5,064,891 | 11/1991 | Fujiki et al. . | |
| 5,081,164 | 1/1992 | Lai . | |
| 5,190,827 | 3/1993 | Lin | 428/447 |
| 5,248,739 | 9/1993 | Schmidt et al. | 525/477 |
| 5,292,586 | 3/1994 | Lin et al. | 428/355 |
| 5,340,866 | 8/1994 | Evans | 524/403 |
| 5,387,105 | 2/1995 | Dougherty et al. . | |
| 5,403,885 | 4/1995 | Voigt et al. | 433/226 |
| 5,569,691 | 10/1996 | Guggenberger et al. . | |

OTHER PUBLICATIONS

EOS "Extra Oral System for Chairside Inlays: Instructions for Use," Vivadent (date unknown).
Dr. B.–Jörg Heinenberg, "Die Neue Konzeption Eines Inlays," *Dental Magazin* (Feb. 1989).
EOS: Ästhetik für Anspruchsvolle, Vivaent Dental GmbH, Postfach 11 52, 7090 Ellwagen, Germany (date unknown).
EOS "The New Light–Curing Composite System for Immediate Chairside Indirect inlays and Veneers," Vivadent USA (date unknown).
"Silicones," *Concise Encyclopedia of Polymer Science and Engineering*, pp. 1048–1059, John Wiley & Sons, Inc., New York (1990).

*Primary Examiner*—Nicholas D. Lucchesi
*Attorney, Agent, or Firm*—Hoffman & Baron, LLP

[57] ABSTRACT

A polymeric composition is provided, comprising:
- a base component, comprising a first alkenyl-terminated short chain polydiorganosiloxane and a cross-linker; and
- a catalytic component, comprising a second alkenyl-terminated short chain polydiorganosiloxane and a catalyst, wherein:
- at least one of the base component and the catalytic component further comprises a filler;
- said first and second alkenyl-terminated short chain polydiorganosiloxanes together comprise from about 15 wt % to about 40 wt %,
- said cross-linker comprises from about 1 wt % to about 15 wt %,
- said catalyst comprises from about 0.005 wt % to about 5 wt %, and
- said filler comprises from about 30 wt % to about 80 wt %, based on the total weight of the composition; and
- wherein the composition sets to a solid elastomeric state at about room temperature following mixing of said base component and said catalytic component. Also provided is a method of making a solid die dental model, comprising the steps of:

preparing an impression of a dental structure, and
fabricating a dental model using said impression by depositing therein a flowable modeling composition as described.

A dental prosthetic, such as a composite restoration, can then be prepared using the solid die.

19 Claims, No Drawings

POLYMERIC COMPOSITION

BACKGROUND OF THE INVENTION

The invention relates to silicone polymeric compositions. In particular, the invention relates to two-part silicone polymer compositions which set to elastomeric solids and which are suitable, inter alia, for making solid die dental models for preparing composite dental restorations and other dental prosthetics.

In reconstructive dentistry, the construction of dental prosthetics, e.g., inlays, veneers, etc., benefits from being performed outside the mouth. Among other advantages, such an approach reduces patient discomfort, and facilitates manipulation of the restoration during construction.

Previously, this process required several time-consuming steps, and usually required the patient to make several visits to the dentist. Usually on the first visit, an elastomeric impression was taken and a temporary restoration fitted in the prepared tooth. Typically, this elastomeric impression is sent to a commercial dental laboratory for fashioning dies and models (positive replications) from the impression (negative registration). These positive replications are commonly fabricated from dental stones and/or epoxy materials. The commercial laboratory then constructs the dentist-prescribed restoration on the positive replication, and provides the completed restoration to the dentist. These are referred to as "indirect restorations."

On the next visit, the temporary restoration is removed, and the dentist then tries the laboratory fabricated restoration in the patient's prepared tooth to determine form, fit, and suitability of the restoration. If necessary, minor adjustments are made to the restoration, which is then permanently placed in the patient. If minor adjustments by the dentist cannot satisfactorily resolve fit and form problems, the restoration, along with the dies and models are returned to the commercial laboratory for re-make and re-trial, requiring installation of still another temporary restoration. Eventually the restoration is delivered to the patient. Typically, while the laboratory fabrication of dies models and restorations is ongoing, the temporary restoration causes patient inconvenience and discomfort and heightens tooth sensitivity. It would be beneficial to the patient to be able to take an impression, make the requisite dies and models, and fabricate and install a restoration all in a single visit, preferably in a minimum of time.

With respect to building indirect restorations, the ability to isolate the tooth or teeth to be restored by using an extra-oral model of the teeth makes the building process simpler and decreases patient discomfort. For example, ready access to the inlay site is gained and moisture problems are eliminated. Further, fabrication of an indirect restoration permits the dentist or a competent auxiliary technician to more precisely fashion a correct anatomical form for the restoration.

Moreover, modem composite inlay materials are light-curable. Curing such materials is easier outside the mouth. However a common option exercised with indirect resin composite restoratives is additional curing by heat application to the restoration. This is done by placing the light-cured restoration, with or without its attendant die, into a suitable thermostatically-controlled oven for a prescribed period (usually about 10 minutes) at a predetermined temperature (usually about 250° F.). This process effectively "post-cures" the resin composite, thereby improving the composite's physical properties.

Furthermore, a falling of currently available light-cured dental composite resins is the inherent tendency to shrink during polymerization. This shrinkage is invariably toward the source of polymerization initiation, typically a light source when resin composites are placed directly into a prepared tooth. This can result in marginal-gap formation with resultant tendencies for microleakage that can cause tooth sensitivity and potential for dental caries. With indirect, extra-oral polymerization, however, shrinkage occurs on the die/model, so the potential for marginal gapping is minimized.

Therefore, indirect methods permit the manufacture of higher quality restorations, leading to restorations which last longer, again improving patient satisfaction. Success, however, depends on the ability to make accurate and precise models of the teeth to be restored, with a minimum of cost in time and materials.

One type of dental model manufacturing method is described in a brochure from Vivadent USA. This method required use of a heavy viscosity condensation silicone putty as an impression material, and a vinyl siloxane as a modeling material. The modeling material apparently was also highly viscous, since it is described as requiring kneading or spatulating prior to use, presumably to mix the reactive components. Such inferior flow characteristics of the modeling material would also make it difficult to ensure that the impression was completely filled. It is believed that the modeling material was excessively flexible when set, making building of accurate restorations relatively difficult to accomplish. In addition, the use of siloxane impression and modeling materials required use of some additional material to prevent bonding of the materials. In any case, this procedure and the requisite materials proved cumbersome to use, and the system is no longer offered for sale to dentists.

In view of the above considerations, it is clear that existing methods and compositions for making dental models have defects which render them impractical or inconvenient for use. Typically, the compositions require too much handling, and the methods require numerous and complex procedures, often preventing completion of the restoration in a single visit, and requiring patients to return on subsequent visits. Conventional modeling materials have also been hard to handle, and suffer from excessive viscosity, rendering modeling Accordingly, it is one of the purposes of this invention to overcome the above limitations in the art of making models suitable for preparing dental restorations, by providing a method which is both simple and fast in execution. The method of the invention eliminates complex and time-consuming steps previously required to make dental models, enabling the practitioner to prepare a model, build a restoration, and implant the restoration into the patient in a single visit.

SUMMARY OF THE INVENTION

It has now been discovered that these and other objectives can be achieved by the present invention, which provides a polymeric composition, comprising:
- a base component, comprising a first alkenyl-terminated short chain polydiorganosiloxane and a cross-linker; and
- a catalytic component, comprising a second alkenyl-terminated short chain polydiorganosiloxane and a catalyst, wherein:
- at least one of the base component and the catalyst component further includes a filler;
- the first and second alkenyl-terminated short chain polydiorganosiloxanes together comprise from about 15 wt % to about 40 wt %, the cross-linker comprises from about 1 wt % to about 15 wt %, the catalyst comprises from about 0.005 wt % to about 5 wt %, and the filler comprises from about 30 wt % to about 80 wt %, based on the total weight of the composition; and wherein the composition sets to a substantially solid elastomeric state at about room temperature following mixing of the base component and the catalytic component.

It is preferred that the first and second alkenyl-terminated short chain polydiorganosiloxanes are vinyl-terminated short chain polydimethylsiloxanes.

It is further preferred that the catalyst comprises a platinum-dialkenyltetraorganodisiloxane complex, more preferably a platinum-divinyltetramethyldisiloxane complex.

The composition can further comprises a reaction inhibitor, such as a 1,3-dialkenyltetraorganodisiloxane. A preferred inhibitor is a 1,3-divinyltetramethyldisiloxane.

The filler in the composition preferably comprises a freely divided inorganic material. A highly preferred filler is a cristobalite flour.

The composition can also further include a colorant in the base component or the catalytic component further includes a colorant. Preferably, the composition is colored to be substantially light reflective.

The composition preferably has an initial viscosity of less than about 30,000 cps, and has a durometer hardness of greater than about 60 as an elastomeric solid. Still more preferably the composition has an initial viscosity of less than about 15,000 cps. Moreover the preferred composition has a durometer hardness of greater than about 80 as an elastomeric solid.

Also, in the preferred composition the first and second alkenyl-terminated short chain polydiorganosiloxanes together comprise from about 20 wt % to about 30 wt % based on the total weight of the composition. The crosslinker preferably comprises from about 2 wt % to about 10 wt % based on the total weight of the composition. The catalyst preferably comprises from about 0.01 wt % to about 2 wt % based on the total weight of the composition. The filler preferably comprises from about 40 wt % to about 70 wt % based on the total weight of the composition.

The invention is also a method of making a dental model, comprising the steps of:

preparing an impression of a dental structure, and fabricating a dental model using the impression by depositing therein a flowable modeling composition comprising:

a base component, comprising a first alkenyl-terminated short chain polydiorganosiloxane and a cross-linker; and a catalytic component, comprising a second alkenyl-terminated short chain polydiorganosiloxane and a catalyst, wherein:

at least one of the base component and the catalyst component further comprises a filler;

the first and second alkenyl-terminated short chain polydiorganosiloxanes together comprise from about 15 wt % to about 40 wt %, the cross-linker comprises from about 1 wt % to about 15 wt %, the catalyst comprises from about 0.005 wt % to about 5 wt %, and the filler comprises from about 30 wt % to about 80 wt %, based on the total weight of the composition; and wherein the composition sets to a solid elastomeric state at about room temperature following mixing of the base component and the catalytic component.

Accordingly, the invention includes a low viscosity, self-setting silicone composition, and a method of using the composition of prepare dental models and composite restorations. The two-part composition flows easily, and sets fast to provide a hard polymeric material having low brittleness. The dimensional stability of the material is excellent, permitting construction of accurate and precise composite dental restorations.

These and other advantages of the present invention will be appreciated from the detailed description and examples which are set forth herein. The detailed description and examples enhance the understanding of the invention, but are not intended to limit the scope of the invention.

DETAILED DESCRIPTION OF THE PREFERRED EMBODIMENTS

The present invention is directed to a silicone polymer composition useful, inter alia, for making dental models suitable for use in preparing dental prosthetics, i.e., composite dental restorations, indirect composite inlays, chairside denture repairs, fast resin veneers or temporaries, and the like. The composition of the invention is a room-temperature vulcanizing (RTV) silicone elastomer supplied as two components, designated herein a base component and a catalytic component. The two components are inherently reactive with one another under ambient conditions (i.e., room temperature, pressure, etc.), and are supplied separately. Polymerization, i.e., the setting or cure reaction, is triggered by simply mixing the two components. Mixing is promoted if the two components are fluids, i.e., self-leveling liquids or low viscosity pastes, with lower viscosity materials tending to be more readily mixed, thereby providing a more homogenous product.

The two-part composition can be delivered into a dental impression by means of a double barreled co-extruding or auto-mixing syringe, with the base component and the catalytic component occupying separate barrels. Depression of the plunger displaces a portion of each of the base component and the catalytic component into a standard mixing nozzle, and the mixed composition exits the nozzle for deposition into the impression space. The mixed composition begins reacting immediately, and self-sets to a solid elastomeric state in only a few minutes under ambient. The composition of the invention is therefore, readily distinguishable from those silicone-based compositions having substantially longer pot-life.

The silicone-based modeling material of the invention is provided as a two-part composition, comprising a base component and a catalytic component. Like other two-part compositions, the base component and the catalytic component are substantially stable until mixed. The base component and the catalytic component each include an alkenyl-terminated, short chain polyorganosiloxane. The polyorganosiloxane in each component can be the same or different. The base component also includes a crosslinker, typically another siloxane compound. The catalytic component also includes a catalyst, typically a solubilized platinum complex. The composition also includes a filler, which may be incorporated into either or both of the base component and the catalytic component. Other and further additives may be included in minor or even trace amounts, such as, for example, colorants, antioxidants, reaction inhibitors, and the like.

The polyorganosiloxanes used in the base component and in the catalytic component may be the same or different, and are preferably polydiorganosiloxane containing a terminal alkenyl group. These polysiloxanes have the general structure:

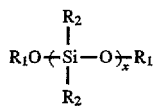

wherein x is a large integer, wherein $R_1$ is an organic group, and wherein $R_2$ is a alkenylsilyl group. $R_1$ is preferably a $C_1$–$C_4$ alkyl group, most preferably a methyl group. $R_2$ is most preferably a vinylsilyl group. Numerous alkenyl terminated polyorganosiloxanes are commercially available, but the composition of the invention employs short chain siloxanes, including, for example, vinyl-terminated short chain polydimethylsiloxanes available from various commercial sources.

The viscosity of the polydiorganosiloxanes useful according to the invention is relative low, generally being in the range of less than about 1000 cps, preferably less than about 250 cps. The low viscosity of the siloxane component imparts to both the base component and the catalytic component a high degree of fluidity, rendering the components easily mixable, and resulting in a high quality elastomeric modeling material.

The short chain, alkenyl-terminated polyorganosiloxanes are generally included in the composition of the invention in an amount of from about 15 weight percent (wt %) to about 40 wt %, based on the total weight of the composition. More preferably, the short chain polyorganosiloxanes in the base and catalytic components together are included in an amount of from about 20 wt % to about 30 wt %, based on the total weight of the composition.

As mentioned, the base component also includes a crosslinker. Any conventional crosslinker suitable for use in vinyl silicone addition reactions may be employed. Highly preferred crosslinkers are methylhydrogensiloxane dimethylsiloxane copolymers, which are commercially available. These are sometimes known as "methylhydrogen fluids." The crosslinker is included in the composition in an amount of from about 1 wt % to about 15 wt %, based on the total weight of the composition. More preferably, the crosslinker is included in an amount of from about 2 wt % to about 10 wt %, based on the total weight of the composition.

The composition optionally includes a colorant, generally included in the base component. Generally, the colorant is included in only a trace amount, so as not to significantly affect the relative quantities of the other components. The colorant, therefore, may be present in the amount of from about 0.05 wt % or less based on the total weight of the composition, but if sufficiently weak can constitute up to 10 wt % or more of the total weight of the composition. When the composition is employed for purposes of modeling dentition, it is preferred to use a colorant which imparts a color to the final set composition which approximates the natural coloration of teeth. One colorant found to suitable for this purpose is FD&C Persian Orange. Other colorants and combinations of colorants can be employed for other purposes as desired by the artisan. Colorants can be added to the catalytic component of the composition of the invention, as long as the catalytic function of the component in setting the silicone materials is not defeated or substantially compromised.

The catalytic component further includes a catalyst, preferably a solubilized platinum catalyst. Any suitable platinum catalyst known in the art can be used, e.g., platinic acid, chloroplatinic acid. However, it has been found that excellent polymerization is obtained when using a catalyst comprising platinum complexed with a divinyltetramethyldisiloxane. However, it is believed that any conventional catalyst can be used. The catalyst is generally provided commercially as a solution in which the largest fraction of the weight of the solution is a solvent, typically a siloxane. For example, 2% solutions can be purchased from commercial manufacturers. Such catalyst compositions are included in the composition of the invention in an amount of from about 0.005 wt % to about 5 wt %, more preferably in an amount of from about 0.01 wt % to about 2 wt %, based on the total weight of the composition.

The catalytic component optionally comprises a small amount of a polymerization inhibitor to control the rate of reaction. While fast reaction times are characteristic of the polymeric composition of the invention, it is desirable to control the reaction time so that the material does not set too fast, i.e., before deposition of the modeling material into the dental impression is completed. Conventional polymerization inhibitors, therefore, can be used to control reaction rate. Preferred inhibitors include, for example, divinyltetramethyldisiloxanes, commercially available from various sources. Because these inhibitors are highly effective, they are generally added only in trace amounts, i.e, less than about 0.001 wt %, based on the total weight of the composition.

In the base component and/or the catalytic component, the filler can be any material which serves to add bulk and texture to the composition, provided that the viscosity of the resulting material is not excessively increased, and that the filler material itself is inert, i.e., does not participate in the setting reaction. The filler also desirably imparts strength to the final silicone material by reinforcement. Inorganic fillers such as silicas are well adapted to perform this function. Different fillers can be used in each of the base component and the catalytic component, but it is preferred if the same material is used in each case. Other additives, e.g., antioxidants, adhesion promoters, etc., can be included in the base component or the catalytic component, displacing a portion of the filler.

Highly preferred fillers include, for example, cristobalite flours (a crystalline form of silica), which are commercially from various sources. Other suitable fillers include other inorganic materials such as silica-based and alumina-based materials, pumices, etc. Optionally, organic polymeric materials can also be used as fillers.

The filler material must be very finely divided, resembling a powder or a flour. Use of a filler having a fine texture promotes flowability of the silicone composition, and enhances the utility of the composition for filling and modeling fine features of dentition. A filler having a particle size of less than about 0.05,μm is desired. Inorganic fillers are especially desirable since they impart excellent reinforcement to the final solid material. Moreover, because the dimensions and stability of the solidified polymeric material are highly significant in dental modeling applications, the filler material should be selected to have a high degree of stability under typical storage conditions.

The filler is included in either or both the base component and the catalytic component of the composition of the invention. Typically, the filler is included in an amount of from about 30 wt % to about 80 wt %, based on the total weight of the composition, regardless of the relative amounts of the filler included in each component. More preferably, the filler is included in an amount of from about 40 wt % to about 70 wt %, based on the total weight of the composition.

An advantage of the present silicone composition is that upon curing the composition obtains a high degree of dimensional stability. Dimensional stability is a highly desirable quality in modeling materials, since such stability permits the use of a single solid die for the construction and reconstruction of prosthetic inserts over a period of time without any substantial loss of accuracy or precision in the dimensions of the inserts. The silicone composition of the invention exhibits less than 1% shrinkage over one month when stored under ambient conditions. This compares favorably against prior art materials.

The mixing of the two parts of the composition of the invention is important to achieving thoroughgoing polymerization. When delivered by a two barrel automixing syringe, the composition is forced through a mixing nozzle, optionally equipped with a micro-tip. But the unusually low viscosity of the uncured composition plays a significant role in the mixing process, since the low viscosity makes mixing substantially easier to achieve than is possible with more viscous compositions. The resulting polymer is, accordingly, of high quality being thoroughly polymerized. Moreover, the high flowability of the composition permits delivery through micro-tips with little resistance, enabling the practitioner to attain a high degree of precision and accuracy in the rate and location of deposition.

The two components are preferably prepared such that equal amounts are employed to prepare the polymerized elastomer. This balance simplifies the use of the composition, since conventional automixing syringes can be employed to deliver the composition. Nonetheless, formulations are contemplated in which the components are employed in unequal amounts.

As used herein the term "dental model" refers to 3-dimensional, full-scale models of any or all of the dental structures, including the hard tissues, i.e., the teeth ("dentition") and/or the soft tissues, i.e., the gum ("gingival") structures. Typically, the practitioner requires accurate and precise models of the dentition, to permit fitting of restorative inlays, etc. Accordingly, the method can include taking an impression of the dentition and/or gingiva, to define an impression space which can then be filled with settable fluid materials, to provide a solid model of the desired structures. For example, according to the method of the invention a modeling material can be deposited to fill the entire dentition space, up to including the gingival margins.

However, accurate and precise models of the gingival structures may be of special interest in cases where the restoration must account for prior tooth loss. In such cases, a modeling material may be used to fill not only the dentition space but also the gingival space defined with the impression. Alternatively, the artisan can employ the modeling material to fill and model the dentition space, and a base material to fill and model the gingival space. Such an approach is especially effective if the modeling material and the base material are color coded to more explicitly distinguish between the dental (hard) and gingival (soft) tissues.

The method comprises forming or casting a dental impression using a flowable impression material. Typically, the flowable impression material is deposited into a tray, e.g., a quadrant tray, followed by impressing the tray onto the dental structures to be modeled. The flowable impression material should be self-setting, and should be allowed to set at least partially prior to removal from the mouth, so that the impression does not deform upon removal. Following removal of the impression tray, the interior surface of the impression defines therein an impression space ("negative registration") which is complementary to or patterned on the 3-dimensional structure of the dental tissues. The impression space is nominally divisible into impression spaces corresponding to the dentition and the gingival structures. The dentition impression space and the gingival impression space are fully contiguous with one another, permitting preparation of a solid dental model representing any or all relevant dental structures.

Any conventional general impression material or bite registration material can be used to prepare a suitable impression, provided that the material sets to a solid. The impression material should also be self-setting, preferably setting within the space of a few minutes. Preferred impression materials include reversible impression materials such as hydrocolloid-based compositions, and irreversible impression materials, such as alginate compositions, the latter type of material generally being more preferred. Suitable impression materials are commercially available. Preferred impression materials include reversible and irreversible hydrocolloid-based compositions, such as alginate compositions, with irreversible materials generally being more preferred. Exemplary commercially available alginate materials include, for example, TRIPHASIX alginate available from Parkell and JELTRATE alginate available from Dentsply Int'l, Inc. Other impression materials are also commercially available, such as general impression materials, e.g., CINCH PLATINUM polyvinylsiloxane available from Parkell, as well as condensation silicones and polyethers, but these are typically substantially more expensive.

If an alginate impression material is employed, it is preferred to apply a surfactant ("wetting agent" or "debubbler") to the interior surface of the impression. Such materials inhibit the formation of bubbles when the modeling material is deposited into the impression, thereby insuring a more accurate die. Surfactant materials are commercially available in spray form, e.g., from Almore Int'l, Inc.

Alternatively, if a polyvinylsiloxane impression material is employed it is desirable to coat the interior surface of the impression with a releasing agent to facilitate separation of the flowable modeling materials used to make the solid die. This is important if the impression material and the modeling material to be deposited into the impression space tend to adhere or bond to one another. Specifically, if the impression material and the modeling material are both vinyl silicone-based, a strong bond will generally form, requiring a releasing agent to disrupt any such bonding. Typically, the releasing agent is a friction-reducing agent such as an oil, but other materials which reduce the tendency of the impression material and the modeling materials to bond to or adhere to one another can be used. One particularly preferred class of releasing agents includes dry TEFLON/silicone sprays, such as the commercially available product SPL-88 by Handler Mfg. Co., Inc. Other materials such as sprayable vegetable oil materials, e.g., PAM spray, can be used. Other usable materials include mineral oils, petroleum jellies, and the like. Any functionally equivalent material can be used provided that it is not chemically incompatible with the impression material and the modeling material.

The flowable two-part silicone composition according to the present invention is inherently self-reactive and self-setting under ambient conditions. The composition in its initial unset state is "flowable," i.e., the material has an initial viscosity low enough to permit substantial self-leveling prior to setting. Preferably the initial viscosity of the composition is less than about 30,000 cps, more preferably less than about 15,000. Such low viscosity is beneficial in that uniform and consistent delivery of the material into the impression space is promoted, to ensure thorough occupation of the impression space without requiring additional physical manipulation, e.g., spatulation. The use of a flowable modeling material thereby permits accurate and precise rendition of even the smaller features of the dentition. Modeling materials which are too viscous, i.e., which require active deformation by being pressed or spatulated into the impression space, rather than simply flowing to occupy the impression space, are therefore not within the scope of the invention.

The polymeric composition self-sets to a solid elastomeric state in less than about an hour under ambient conditions (e.g., room temperature, pressure, etc.), preferably within about 15 minutes, more preferably within about 5 minutes.

This composition is compatible with most conventional general impression materials and bite registration materials. Specifically, the silicone composition of the invention separates easily from most hydrocolloid-based impression materials, but bonds strongly to vinyl siloxane base materials. The silicone material of the invention is substantially non-adherent to hydrocolloid and alginate-type impression materials, permitting easy separation of the die following solidification.

Moreover, the silicone composition has excellent harness characteristics. The silicone material of the invention, for example, sets to a rigid state having a durometer hardness of about 92–93, yet permitting hardened restoratives, like light- and/or heat-cured resin composites, to release from undercuts in the die or model. This feature makes this material particularly resistant to deformation during the process of constructing indirect composite prosthetics, making the fit of the resulting prosthetic more accurate and more permanent. Durometer hardness is measurable using standardized techniques.

The silicone composition of the invention has an initial viscosity which is very low as compared to the viscosity of conventional impression materials. This low initial viscosity permits the composition to be extruded, and to flow easily into the impression material to model even minute details of the dentition. Even so, the artisan appreciates that special care should be taken to avoid trapping bubbles in the impression sites, e.g., registration of teeth prepared to receive dental restorations and other spaces to be restored. Surfactant materials may be coated onto the impression surface to eliminate bubbles prior to depositing the modeling material. Because the composition sets quickly, typically in less than about 5 minutes, the practitioner may wish to start depositing the material in the site to be restored, i.e., the replicate tooth corresponding to the prepared tooth, filling the remainder of the impression afterward.

As noted, the silicone material described herein does not effectively bond or adhere to alginate-type impression compositions. Accordingly, this pair of materials is highly preferred for use according to the method of the invention. Other impression materials may be selected for use with the silicone composition of the invention.

In the modeling of dental structures, a base material can be employed to provide a substantial base to the dental model. The base material be any material which is initially substantially deformable, but preferably non-slumping or non-self-leveling, and which sets to a substantially solid, relatively undeformable state. General impression materials of light to heavy body or bite registration materials can be used. Numerous materials meeting these criteria are known in the art, include plaster of Paris, dental stones, silicone polymers, etc.

In a preferred scenario, the base material is deposited directly onto the exposed surface of the modeling material while in the impression, in an amount sufficient to at least substantially cover the modeling material. Additional base material can be deposited into a base-former tray, and the base-former tray and the impression tray then placed into substantial co-extensive contact with one another prior to setting. This permit the base material in each tray to merge with the other to create a unitary base. The use of a base-former tray facilitates subsequent use of the solid die by providing a squared base to stabilize the model for building the restoration. This approach further facilitates reassembling separated dies (for convenient handling) in a precise and accurate relationship with adjacent segments of the dental model.

The base material should be deformable, but have a moderate viscosity to enable easy handling. Non-self-leveling and non-slumping materials are generally preferred, e.g, general impression materials or bite registrations materials of light to heavy body can be used. Preferably, the base material should self-set quickly to a solid form, e.g., in about two minutes at about room (ambient) temperature. The set base material be relatively hard, to provide stability when being worked to build the restoration.

Methods of making dental models can employ the composition of the invention and a base material which are color coded to differentiate or define the hard and soft tissues of the oral cavity. For example, the use of a modeling material which approximates the color or shade of teeth can provide an aesthetically appealing model. More important, however, a paler color is preferred because a paler surface will provide better reflectance (higher albedo) of the light delivered from a light-curing unit used to photo-polymerize resin composite restoratives.

In addition, the base material can be selected to contrast with the modeling material, to more effectively differentiate the modeled teeth to the observer. For example, adding a colorant to the silicone composition of the invention to render the composition a pale tan or beige color permits nice contrast with the blue color of the BLU-MOUSSE base material mentioned herein. In particular, the FD&C colorant Persian Orange has been found to be ideally suited for coloring the silicone modeling material. Other colorants may be selected for particular purposes. The colorant preferably does not interfere with the polymerization process, and preferably resists degradation by heat and light such as may be used in curing composite restorations.

More important, the base material is selected to adhere or bond to the polymeric composition, such that upon setting a unitary solid dental model is provided. If a vinyl silicone base material is used, the silicone in the composition of the invention and the silicone in the base material will form intermolecular cross-links, thereby establishing an extremely stable bond between the two materials. It is possible to provide a layer of adhesive between the silicone modeling material and the base material, but this approach is less desirable from the standpoint of convenience and perhaps stability over time. For example, a binder such as a layer of adhesive or mechanical fasteners (e.g., pins, dowels, or screws) can be positioned between the modeling material and the base material. This can be accomplished after deposition of the modeling material but before the deposition of the base material. Alternatively, once the two materials have set to solids, the two pieces can be bound using such adhesives, fasteners, or other functionally equivalent binders. It is further desirable that the base material not adhere to the impression material, since the base material generally comes into contact with the impression when deposited onto the modeling material. Separation of the solid die from the impression can depend upon separability of the base material from the impression material. It is helpful if the base material is readily separable from the plastic base-former tray if such is used, since (optional) subsequent heat tempering of the restoration is generally performed at a temperature sufficient to melt the polymeric materials from which such trays are generally made.

The base material can be any material having the appropriate physical characteristics. Highly preferred base materials include vinyl polysiloxane materials, for example, BLU-MOUSSE and BLU-MOUSSE SUPER-FAST, both of which are available from Parkell Products, Inc., New York. The BLU-MOUSSE materials are excellent for use in conjunction with the silicone modeling material of the invention. Moreover, the BLU-MOUSSE materials have excellent hardness characteristics without any brittleness, having a durometer of about 85.

The following examples are provided to assist in a further understanding of the invention. The particular materials and conditions employed are intended to be further illustrative of the invention and are not limiting upon the reasonable scope thereof.

In addition, the composition of the invention is described with particular reference to uses in the preparation of dental models and composite restorations. It is to be understood, however, that the composition is believed to be unique regardless of particular applications, and that the composition can be used for other useful purposes such as may suit the artisan, including, but not limited to, manufacture of tool dies and/or molds, use as sealants and adhesives, etc.

EXAMPLE 1

A flowable modeling material was prepared according to the method of the invention. This material is provided as a two-part composition in which the component parts have the following compositions:

| Component | Amount by Weight |
| --- | --- |
| Base Component | |
| Short Chain Polydimethylsiloxane, vinyl-terminated | 24.5% |
| Methyl hydrogen siloxane crosslinker | 11.1% |
| Cristobalite flour | 64.3% |
| FD&C colorant (Persian Orange) | Trace |
| Catalytic component | |
| Short Chain Polydimethylsiloxane, vinyl-terminated | 31.1% |
| Cristobalite flour | 68.8% |
| Platinum-Divinyltetramethyldisiloxane complex | Trace |
| 1,3-Divinyltetramethyldisiloxane | Trace |

The base component and the catalytic component are delivered in substantially equal amounts by weight, and are directly injectable or extrudable from an automixing injector into the dental impression space. Accordingly, no mixing or heading of the components is necessary. Upon injection into the impression space, the base component and the catalytic component undergo a fast setting reaction (addition polymerization), solidifying within about two minutes. The material also bonds directly and strongly (via-intermolecular cross-links) to other vinyl silicone materials such as BLU-MOUSSE mentioned hereinabove, permitting straightforward formation of unitary solid dies. This bonding process is potentiated if the base material, e.g., BLU-MOUSSE, is deposited into contact with the silicone modeling material prior to the modeling material completing its setting process. Conventional restoration composite materials, on the other hand, are substantially non-adherent to the silicone polymer material, and separate readily in preparation for implantation.

EXAMPLE 2

After preparing the tooth to be restored, a conventional alginate quadrant impression is taken. (Double arch impression trays can also be employed to generate articulated impressions of upper and lower dental structures in one procedure. This is especially useful in the preparation of onlays and other restorations where the occlusal surface is substantially compromised.) A surfactant (debubbler) material may be employed, and the excess dumped. Then, using a standard impression gun, a silicone-based modeling material according to the invention is extruded into the teeth being restored, then into the other teeth. A vibrator is not typically necessary to deposit the silicone composition, due to its excellent flow characteristics. A cartridge gun is again used, to express a layer of BLU-MOUSSE or BLU-MOUSSE SUPER-FAST onto the silicone modeling material, without waiting for the modeling material to set. A plastic base-former is filled with BLU-MOUSSE, and immediately seated onto the BLU-MOUSSE resident in the impression. After about two minutes (30 seconds in the case of the BLU-MOUSSE SUPER-FAST), the solidified die is removed from the impression tray, and the base-former is removed from the die. Excess BLU-MOUSSE is trimmed with a razor blade or knife.

For preparing the restoration, the die is cut with a razor blade, to isolate the tooth or teeth to be restored. The cut is made from the upper edge of the modeled teeth about two-thirds to three-fourths of the way toward the base. The base is then snapped, to provide an irregular surface permitting easy mating and reassembly of the pieces of the die if desired. If die trimming is required for easy access to the margins, a conventional blade is used.

A dental restoration is then built using the solid dies by means of conventional techniques. Typically, a curable composite material is deposited into a sulcus in the modeled tooth to be restored, preferably using incremental build-up to ensure thorough polymerization. No prelubrication is necessary. The composite material is then cured on the die, e.g., by using actinic light. The silicone material of the invention can be colored to approximate the color of the teeth for cosmetic reasons, but this light color will also provide an excellent reflective surface to promote internal polymerization during the light curing process. Optionally, the cured composite is tempered by heating in a conventional toaster oven for about 10 minutes at about 250° F. The cured composite is then removed from the die (separating easily from the silicone modeling material), fit intraorally, and cemented into place.

Thus, while there have been described what are presently believed to be the preferred embodiments of the present invention, those skilled in the art will realize that other and further embodiments can be made without departing from the spirit of the invention, and it is intended to include all such further modifications and changes as come within the true scope.

What is claimed is:

1. A polymeric composition, comprising:
    a base component, comprising a first alkenyl-terminated short chain polydiorganosiloxane and a cross-linker; and
    a catalytic component, comprising a second alkenyl-terminated short chain polydiorganosiloxane and a catalyst, wherein:
at least one of the base component and the catalytic component further includes a filler;

said first and second alkenyl-terminated short chain polydiorganosiloxanes together comprise from about 15 wt % to about 40 wt %, said cross-linker comprises from about 1 wt % to about 15 wt %, said catalyst comprises from about 0.005 wt % to about 5 wt %, and said filler comprises from about 30 wt % to about 80 wt %, based on the total weight of the composition; and wherein the composition sets to a substantially solid elastomeric state at about room temperature following mixing of said base component and said catalytic component.

2. A composition according to claim 1, wherein said first and second alkenyl-terminated short chain polydiorganosiloxanes are vinyl-terminated short chain polydimethylsiloxanes.

3. A composition according to claim 1, wherein said catalyst comprises a platinum dialkenyltetraorganodisiloxane complex.

4. A composition according to claim 1, wherein said platinum-dialkenyltetraorganodisiloxane complex is a platinum-divinyltetramethyldisiloxane complex.

5. A composition according to claim 1, wherein said composition further comprises a reaction inhibitor.

6. A composition according to claim 5, wherein said reaction inhibitor comprises a 1,3-dialkenyltetraorganodisiloxane.

7. A composition according to claim 6, wherein said 1,3-dialkenyltetraorganodisiloxane is a 1,3-divinyltetramethyldisiloxane.

8. A composition according to claim 1, wherein said filler comprises a finely divided inorganic material.

9. A composition according to claim 8, wherein said filler comprises a cristobalite flour.

10. A composition according to claim 1, wherein said base component or said catalytic component further includes a colorant.

11. A composition according to claim 10, wherein said composition is colored to be substantially light reflective.

12. A composition according to claim 1, wherein said composition has an initial viscosity of less than about 30,000 cps, and has a durometer hardness of greater than about 60 as an elastomeric solid.

13. A composition according to claim 12, wherein said composition has an initial viscosity of less than about 15,000 cps.

14. A composition according to claim 12, wherein said composition has a durometer hardness of greater than about 80 as an elastomeric solid.

15. A composition according to claim 1, wherein said first and second alkenyl-terminated short chain polydiorganosiloxanes together comprise from about 20 wt % to about 30 wt % based on the total weight of the composition.

16. A composition according to claim 1, wherein said crosslinker comprises from about 2 wt % to about 10 wt % based on the total weight of the composition.

17. A composition according to claim 1, wherein said catalyst comprises from about 0.01 wt % to about 2 wt % based on the total weight of the composition.

18. A composition according to claim 1, wherein said filler comprises from about 40 wt % to about 70 wt % based on the total weight of the composition.

19. A method of making a dental model, comprising the steps of:

preparing an impression of a denial structure, and fabricating a dental model using said impression by depositing therein a flowable modeling composition comprising:

a base component, comprising a first alkenyl-terminated short chain polydiorganosiloxane and a cross-linker; and a catalytic component, comprising a second alkenyl-terminated short chain polydiorganosiloxane and a catalyst, wherein:

at least one of the base component and the catalytic component further comprises a filler;

said first and second alkenyl-terminated short chain polydiorganosiloxanes together comprise from about 15 wt % to about 40 wt %, said cross-linker comprises from about 1 wt % to about 15 wt %, said catalyst comprises from about 0.005 wt % to about 5 wt %, and said filler comprises from about 30 wt % to about 80 wt %, based on the total weight of the composition; and wherein the composition sets to a solid elastomeric state at about room temperature following mixing of said base component and said catalytic component.

\* \* \* \* \*

UNITED STATES PATENT AND TRADEMARK OFFICE
CERTIFICATE OF CORRECTION

PATENT NO. : 5,718,586
DATED : February 17, 1998
INVENTOR(S) : Sharp et al.

It is certified that error appears in the above-identified patent and that said Letters Patent is hereby corrected as shown below:

| | |
|---|---|
| In Column 1, Line 55, | the patent now reads "modem composite", this should read --modern composite--. |
| In Column 1, Line 66, | the patent now reads "a falling", this should read --a failing--. |
| In Column 3, Line 21, | the patent now reads "a freely", this should read --a finely--. |
| In Column 4, Line 47, | the patent now reads "under ambient.", this should read --under ambient conditions--. |
| In Column 8, Line 65, | the patent now reads "about 30,000 eps", this should read --about 30,000 cps--. |
| In Column 11, Line 56, | the patent now reads "mixing or heading", this should read --mixing or kneading--. |

UNITED STATES PATENT AND TRADEMARK OFFICE
CERTIFICATE OF CORRECTION

PATENT NO. : 5,718,586

DATED : February 17, 1998

INVENTOR(S) : Sharp et al.

It is certified that error appears in the above-identified patent and that said Letters Patent is hereby corrected as shown below:

<u>In Column 14, Line 21,</u>  the patent now reads "a denial structure", this should read --a dental structure--.

Signed and Sealed this

Ninth Day of June, 1998

Attest:

BRUCE LEHMAN

Attesting Officer   *Commissioner of Patents and Trademarks*